W. Lilley.
Propagation & Treatment of House-Plants
Nº 75555    Fig.1    Patented Mar. 17, 1868.
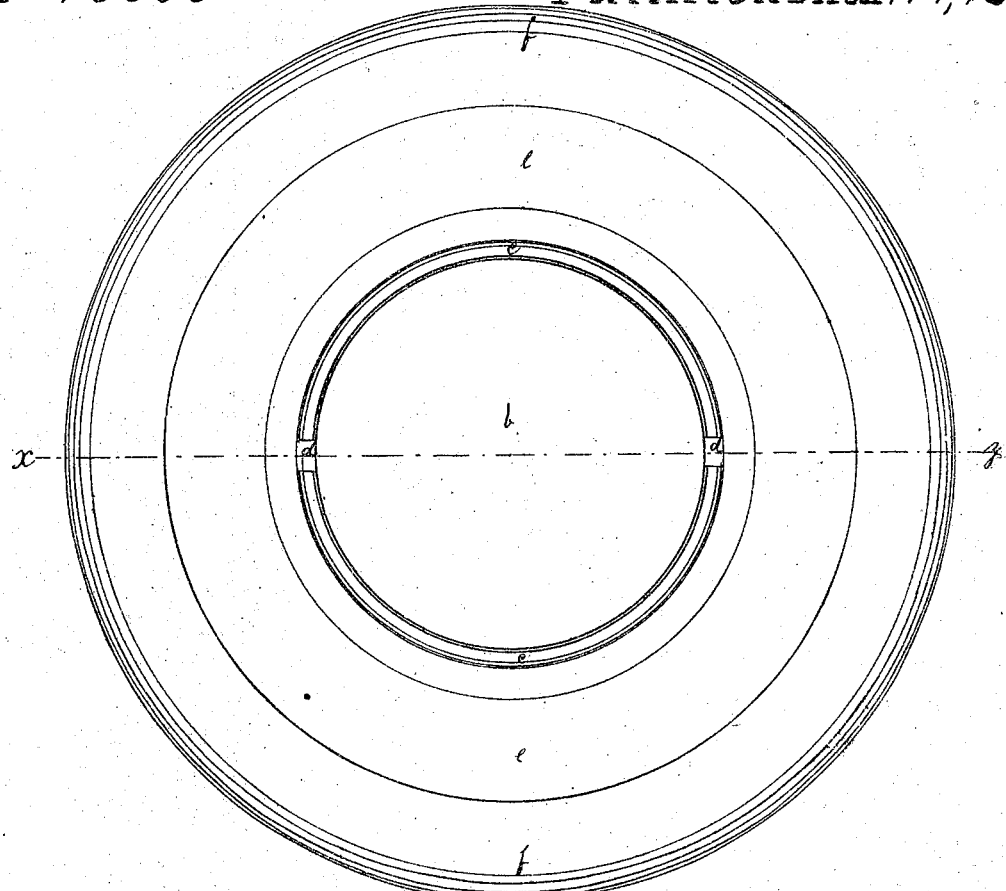
Fig. 2.
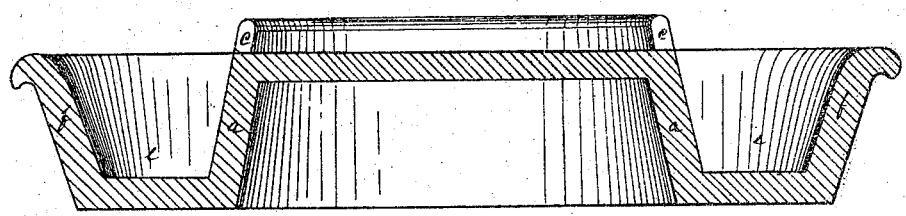
Fig. 3.
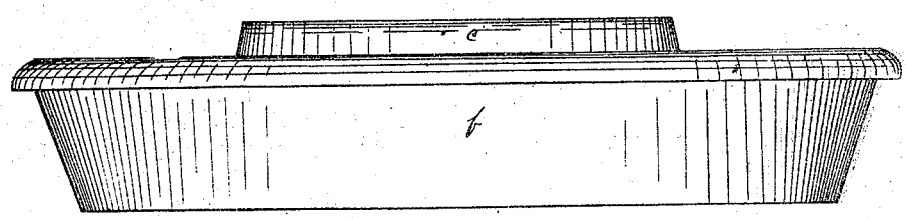
Witnesses
Thos. T. Everett
J. Smith
Inventor
Wm Lilley

United States Patent Office.

WILLIAM LILLEY, OF WASHINGTON, DISTRICT OF COLUMBIA.

Letters Patent No. 75,555, dated March 17, 1868.

IMPROVEMENT IN THE PROPAGATION AND TREATMENT OF HOUSE-PLANTS.

*The Schedule referred to in these Letters Patent and making part of the same.*

TO ALL WHOM IT MAY CONCERN:

Be it known that I, WILLIAM LILLEY, of the city of Washington, in the District of Columbia, have invented a certain new and useful Improvement in Propagating and Treating House-Plants; and I do hereby declare that the following is a full, clear, and exact description of the same, reference being had to the accompanying drawings, and to the letters and marks thereon, which said drawings form part of this specification, and represent a saucer for a flower or plant-pot—

Figure 1 thereof being a top view,
Figure 2 a view by cross-section, on the line $x\ y$ of fig. 1, and
Figure 3 a side view.

In each of these figures like marks and figures are used to indicate like parts.

In propagating or growing plants, either from cuttings or from seed, in ordinary apartments and dwelling-houses, it is well known that the air is too dry for a healthy and thrifty condition of most of the plants usually thus cultivated, and known as house-plants. A too dry condition of the atmosphere surrounding plants subjects them to injury from aphides or plant-lice and other insects, and therefore frequent sprinkling and watering of the plants has to be resorted to. If plants or cuttings be placed in the pot standing in the saucer now in common use, the water about the roots of the plants or about the granulations of the cutting, will generally be too great in quantity if the pot be freely watered, or too dry, if scantily watered, for most cuttings and plants, the supply of water and drainage always being difficult to regulate, unless under such circumstances and conditions.

My invention has for its object the remedying of the difficulties here alluded to in propagating and cultivating house-plants; and it consists in so forming a saucer for the pot that, while a proper supply of water is afforded to the roots or granulations, the leaves and flowers shall also have the benefit and advantage of a moist or humid condition of the air immediately about them.

The saucer, it will be noticed, has an upward deflection or extension, $a$, the top, $b$, of which forms the floor for the bottom of the pot. This top, $b$, has a slight rim, $c$, with two or more notches, $d$, so that the drainage from the pot will not be interrupted or interfered with. The annular space $e$, between the extension $a$ and the sides $f$ of the saucer, is the water-chamber. For some plants and cuttings the supply of water to this chamber will need to be full, while for others scant, depending upon the character and condition of the plant or cutting, or of the kind of seed, if the cultivation be from seed, so that, in some instances, the quantity of water drained through the earth in the pot will be sufficient, while, in other instances, water can be poured direct into the space $e$. The water in this chamber undergoing evaporation to a greater or less degree, due to the temperature of the air, will pass up a current of moist air into and among the leaves and flowers, and thus give to the plant all the benefit that plants have from a proper condition of air in well-regulated conservatories.

In all unglazed pots and saucers, and in such as have the exterior surface only glazed, water will find its way up to the earth in the pot by absorption through the pot itself, and this, in many instances, will answer best for some plants or cuttings that may require special treatment. If the exterior surface of this saucer be glazed, the evaporation of the water through its sides will be prevented, as will also be the case with the pots if the exterior surface be glazed, while the drainage and absorption will be continued.

As is evident, in carrying out my invention, saucers of other forms than the one here shown and described may be used, so long as the principles upon which it is constructed are retained, and, instead of having the exterior surfaces glazed, as herein named, they may be painted or coated with some material or solution to prevent evaporation.

What I claim as my invention, and desire to secure by Letters Patent, is—

Propagating and treating house-plants in the manner and by the means substantially as and for the purposes herein set forth.

This specification signed, this 12th day of February, 1868.

WM. LILLEY.

Witnesses:
THOS. T. EVERETT,
T. SMITH.